(12) United States Patent
Vander Veen et al.

(10) Patent No.: US 7,519,357 B2
(45) Date of Patent: *Apr. 14, 2009

(54) SYSTEM AND METHOD FOR ACCESSING CONTACT INFORMATION ON A COMMUNICATION DEVICE

(75) Inventors: Raymond P. Vander Veen, Waterloo (CA); Andrew D. Bocking, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/831,259

(22) Filed: Jul. 31, 2007

(65) Prior Publication Data

US 2008/0020742 A1    Jan. 24, 2008

Related U.S. Application Data

(63) Continuation of application No. 10/528,529, filed as application No. PCT/CA03/01431 on Sep. 19, 2003, now Pat. No. 7,266,367.

(60) Provisional application No. 60/411,821, filed on Sep. 19, 2002.

(51) Int. Cl.
*H04M 3/42* (2006.01)
*H04M 1/56* (2006.01)

(52) U.S. Cl. ............. 455/415; 379/142.04; 379/142.06

(58) Field of Classification Search ................. 455/415, 455/566; 379/142.02, 142.06, 142.17, 207.15, 379/433.04, 88.19, 93.23, 142.01, 245–247, 379/88.21; 709/1–6
See application file for complete search history.

(56) References Cited

U.S. PATENT DOCUMENTS

| 5,408,528 | A | 4/1995 | Carlson et al. |
| 5,475,744 | A | 12/1995 | Ikeda |
| 6,052,451 | A | 4/2000 | Boero et al. |
| 6,442,263 | B1 | 8/2002 | Beaton et al. |
| 6,813,344 | B1 * | 11/2004 | Lemke ................. 379/142.06 |
| 7,046,994 | B1 | 5/2006 | Padawer et al. |
| 7,127,237 | B2 | 10/2006 | Naruse et al. |

FOREIGN PATENT DOCUMENTS

| EP | 0 930 593 A1 | 7/1999 |
| JP | 2000-201225 | 7/2000 |
| JP | 2002-084360 | 10/2006 |

OTHER PUBLICATIONS

Translation of Notice for Reasons for Rejection dated Feb. 21, 2007 (Japanese Patent Application No. 2004-536733).

* cited by examiner

*Primary Examiner*—George Eng
*Assistant Examiner*—Nam Huynh
(74) *Attorney, Agent, or Firm*—Jones Day; Krishna K. Pathiyal; Robert C. Liang

(57) ABSTRACT

Contact records are stored. Each record has values in respective fields, including first and second fields and a contact identifier field. A communication, that includes a network identifier, is received. Which of the records matches the identifier is determined based on the value in the respective record's contact identifier field matching the identifier. If multiple records match the identifier and those matching records have a common value in the first field, then the common value is displayed without duplication.

18 Claims, 5 Drawing Sheets

| | 314 | 316 | 318 | 320 | 322 | 324 | 326 | 328 | |
|---|---|---|---|---|---|---|---|---|---|
| | FIRST NAME | LAST NAME | TITLE | COMPANY | BUSINESS TELEPHONE NUMBER | HOME TELEPHONE NUMBER | EMAIL ADDRESS | PHYSICAL ADDRESS | ... |
| 300 | JOHN | DOE | | | | 555-1234 | | 12 MAIN ST. | |
| 302 | JANE | DOE | | | | 555-1234 | | 12 MAIN ST. | |
| 304 | MIKE | JONES | VP SALES | ACME | 555-8888 | 555-0010 | mjones@acme.com | | |
| 306 | AMY | RICHARDS | CFO | ACME, Inc. | 555-8888 | 555-1001 | amy@acme.com | | |
| 308 | LUCY | CHEN | | | 555-8888 | | | | |
| 310 | JACQUES | LACHANCE | CONSULTANT | XYZ Inc. | 555-4321 | 555-5555 | jl@coolmail.com | 100 52nd ST. | |
| | ... | | | | | | | | |

Fig. 3

SYSTEM AND METHOD FOR ACCESSING CONTACT INFORMATION ON A COMMUNICATION DEVICE

CROSS-REFERENCE TO RELATED APPLICATIONS

This is a continuation of U.S. application Ser. No. 10/528,529, filed Mar. 18, 2005, now U.S. Pat. No. 7,266,367, which was the Nationalization Stage of International Application No. PCT/CA03/01431, filed Sep. 19, 2003, which claims benefit of U.S. Provisional Application No. 60/411,821, filed Sep. 19, 2002, all three applications hereby incorporated by reference.

TECHNICAL FIELD

This application relates to accessing contact information on a communication device.

BACKGROUND

Communication devices having a contact information store used to display contact information, such as a name and telephone number, for an incoming communication are known in this field. For example, a typical mobile communication device may match a network identifier (e.g., a telephone number) in an incoming call with records in a contact information store to display the name of the caller. However, this caller identification method does not account for the possibility that the same network identifier may be associated with multiple records in the contact information store. For example, if a mobile communication device has stored contact information records for persons named X and Y who work at the same company and thus have the same business telephone number, when Y telephones from her place of business, the mobile communication device may incorrectly display "X" to identify the caller.

SUMMARY

Contact records are stored. Each record has values in respective fields, including first and second fields and a contact identifier field. A communication, that includes a network identifier, is received. Which of the records matches the identifier is determined based on the value in the respective record's contact identifier field matching the identifier. If multiple records match the identifier and those matching records have a common value in the first field, then the common value is displayed without duplication.

Preferably, if multiple records match the identifier and those matching records have a first common value in the first field and a second common value in the second field, then both the first common value and the second common value are displayed. The network identifier can be displayed in addition to the common value. Ay value that is not common to all the matching records is not displayed. If no records match the identifier, then the network identifier can be displayed. If only one record matches the identifier, then the value that is in a name field of the matching record can be displayed. The first field can be a last name field and the second field can be a first name field. The network identifier can be a telephone number, and the contact identifier field can be a telephone number field. The determining of which records match the identifier can be based on the last seven of digits of the telephone number matching the last seven digits of the value in the telephone number field. The contact identifier field can include first and second telephone numbers. The storing, receiving, determining and if-then steps can be performed by a mobile communication device.

BRIEF DESCRIPTION OF THE DRAWINGS

FIG. 3 is a table illustrating an example contact information store.

DESCRIPTION

Figure 1:
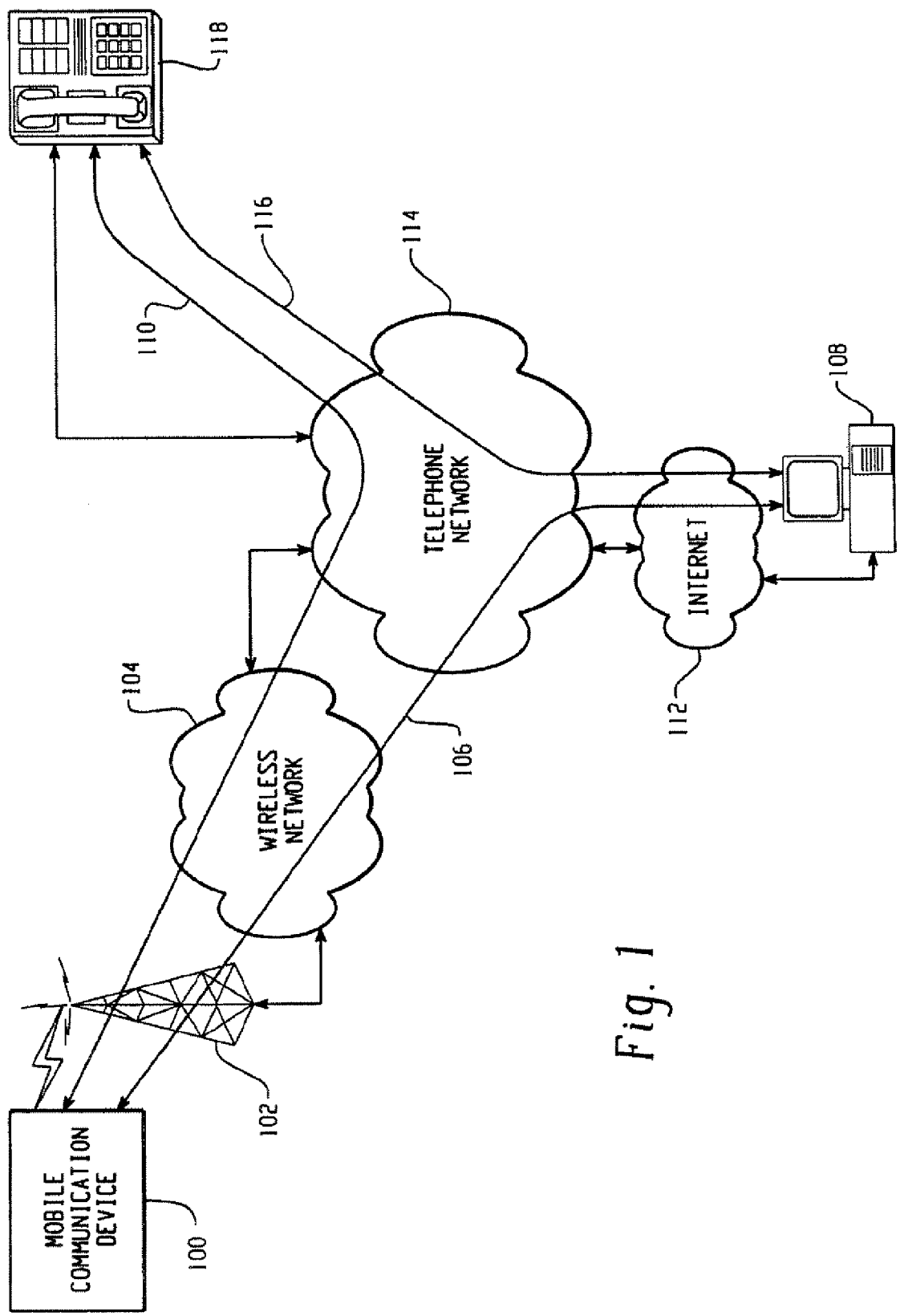
FIG. 1 is a block diagram of an example communication system.

With reference now to the drawing figures, FIG. 1 is a block diagram of an example communication system, including a wireless network 102, 104, a computer network (e.g. the Internet), and a telephone network 114. Also illustrated are a mobile communication device 100, a telephone 118 and a personal computer 108, all of which are examples of communication devices that may send and receive communications via the communication system.

The telephone 118 accesses the communication system via the telephone network 114. The mobile communication device 100 accesses the communication system via the wireless network 102, 104. The personal computer 108 accesses the communication system via the computer network 112. Since the wireless network 102, 104, computer network 112, and telephone network 114 are all interconnected, each communication device 100, 108, 118 in the system can request and establish a network connection for voice communication (e.g., a telephone call) with each of the other communication devices that are connected to the system.

It should be understood that the communication system illustrated in FIG. 1 represents one illustrative example communication system. However, other system topologies could also be used. For example, in addition to voice communication capabilities, the mobile communication device 100 may also be configured for data communications via a data communication network and the Internet 112.

Figure 2:
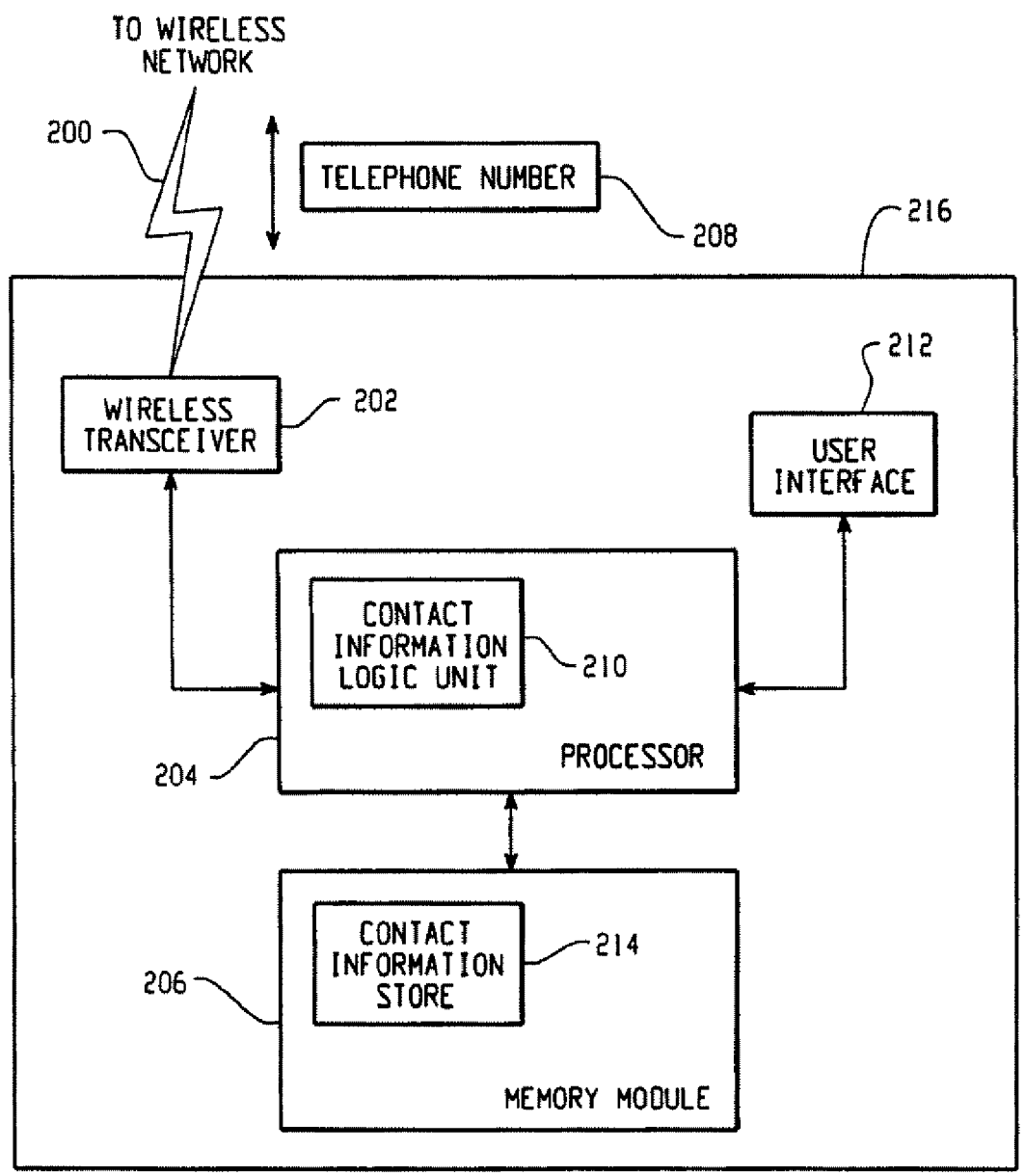
FIG. 2 is a block diagram of a mobile communication device having a contact information logic unit for accessing contact information in a contact information store.

FIG. 2 is a block diagram of a mobile communication device 216 having a contact information logic unit 210 for accessing contact information in a contact information store 214. The mobile communication device 216 also includes a wireless transceiver 202, a processor 204, a memory module 206 and a user interface 212. Also illustrated are a wireless communication 200 (e.g., a telephone call) transmitted or received by the mobile communication device 216 via a wireless network, and a network identifier 208 (erg., a telephone number) included in the communication 200.

The wireless transceiver 202 enables the mobile communication device 216 to send and receive communications 200 over a communication system via a wireless network 102, 104. The wireless transceiver 202 may, for example, include a single transceiver circuit or separate receiver and transmitter circuits. In addition, the wireless transceiver 202 may be included in a communication subsystem, as described below with reference to FIG. 6.

The memory module 206 may include a memory device or combination of memory devices (e.g., Flash memory, random access memory (RAM), etc.), and is used by the mobile communication device 216 to store and retrieve data, programs, and/or other information. The contact information store 214 is included in the memory module 206, and is used to store contact information relating to other communication devices. An example contact information store 214 is described below with reference to FIG. 3.

The user interface 212 may include may include input device (e.g., a keyboard, a keypad, a thumbwheel, a touchscreen, etc.) and one or more output device (e.g., a display, a speaker, etc.).

The processor 204 may, for example, include of a microprocessor, a digital signal processor (DSP), and/or other processing device(s). The processor 204 is coupled to the wireless transceiver, the memory module and the user interface, and is operable to control the operation of the mobile communication device 216. For example, the processor 204 may be operable to send and receive data from the user interface 212, to store and retrieve data in the memory module 206, to execute programs stored in the memory module 206, and to cause the wireless transceiver 202 to transmit and receive information over the communication system.

The contact information logic unit 210 may, for example, be a program stored in the memory module 206 and executed by the processor 204. The contact information logic unit 210 is operable to search the contact information store 214 to identify contact information records relating to a received network identifier 208, and to retrieve the identified contact information for display by the user interface 212.

In operation, when the mobile communication device 216 receives a communication request 200 for a telephone call, the telephone number 208 is received by the wireless transceiver 202 and sent to the processor 204, where it is processed by the contact information logic unit 210. Alternatively, for outgoing calls, the telephone number is provided to the contact information logic unit 210 by the user via the user interface 212 The contact information logic unit 210 uses the telephone number 208 to search the contact information store 214 for contact information which is associated with the telephone number. This information may, for example, include the first name, last name and company name from one or more contacts in the contact information store 214 (see, e.g., FIG. 3).

The contact information logic unit 210 searches for contact information by attempting to match the telephone number 208 with telephone numbers stored in the contact information store 214, and then retrieves the records in which the matched fields are contained. A field may be considered to match the received telephone number if the last seven digits of the received telephone number (excluding private branch extension (PBX) numbers) are the same as the last seven digits of the telephone number in the value of the field. In this manner, it is more likely that a received telephone number will properly match a telephone number field whose value only includes the local portion of a telephone number without an area code or country code as well as international telephone number formats.

The contact information logic unit 210 then processes the identified records to retrieve contact information for display via the user interface 212. The type of contact information displayed is determined by the number of identified contact information records. For example, if no records are identified with matching telephone number fields, then the received telephone number 208 is displayed. If one matching contact information record is identified, then the contact information logic unit 210 may display one or more name field from the identified record, such as a first name field and a last name field 316. If more than one matching contact information record is identified, however, then the contact information logic unit 210 may display a contact record field that is common to the identified contact records. For example, if the matching records each identify the same business entity name, then this common business name may be displayed by the contact information logic unit 210 instead of a more specific field, such as a first or last name field. In another example, if the received telephone number matches a home number field in multiple records, and the matching records each include the same last name field, then the common last name field may be displayed. In other cases where multiple records are identified, the telephone number 208 may be displayed, or alternatively, the first name and last name from the first record found may be displayed. An example operation of the contact information logic unit 210 is described in more detail below with reference to FIG. 5.

FIG. 3 is a table illustrating an example contact information store 214. The contact information store is configured to store contact information records 300, 302, 304, 306, 308, 310 associated with other mobile communication devices. Each contact information record contains contact information for one contact. The contact information in a contact information record is divided into a plurality of fields, each having a name and a value. Example field names include "first name" 314, "last name" 316, "title" 318, "company" 320, "business telephone number" 322, "home telephone number" 324, "email address" 326, and "physical address" 328. Each field value may include information of a type described by its name, or may contain no information. For example, the illustrated contact information record for John Doe 300 has values for the fields named "first name" ("John"), "last name" ("Doe"), "home telephone number" ("555-1234"), and "physical address" ("12 Main St."), whereas the contact information record for Jacques Lachance 310 has values for all of the field names in the contact information store.

It should be understood that the example field names illustrated in FIG. 3 may be modified without affecting the meaning of the fields. For example, the field named "business telephone number" could instead be named "work telephone number". A contact information store may also contain fewer fields or additional fields. Also, the values of the fields in FIG. 3 are for illustrative purposes only. The actual values of fields in a contact information store may, for example, be entered by a user of a communication device on which the contact information store is implemented.

In addition, a mobile communication device may use a data structure stored in the memory module 206 to provide a more efficient means of retrieving contact information from the contact information store 214. For example, a hash table may be used that is organized into keys and values. Given a particular key, a hash table returns a value associated with that key in a shorter time period than would be required to sequentially search through all of the data until that value is found. The keys for the hash table may, for example, be the last seven digits from the telephone numbers in the contact information store 214. The values for the hash table may then be the contact information records.

Figure 4:
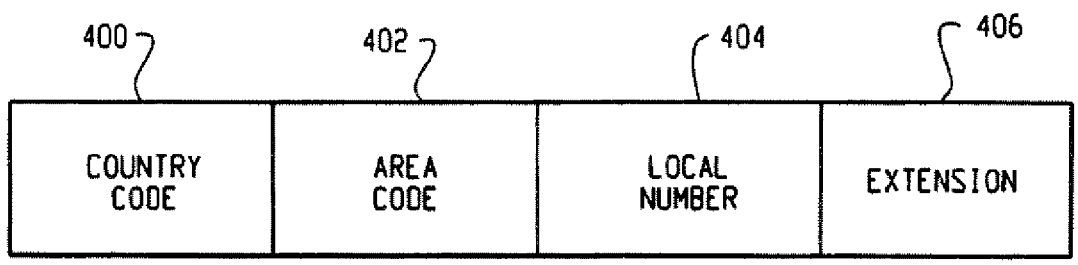
FIG. 4 is a diagram of an example telephone number format.

FIG. 4 is a diagram of an example telephone number format. A telephone number is an example of a network identifier, which is used to identify a resource (i.e., a communication device) in a communication system. The telephone number format includes sections for a country code 400, an area code 402, a local number 404 and an extension 406. The country code 400 is a number that identifies a country. The area code 402 is a number that identifies a region in a country. The local number 404 identifies a telephone line within a region. The extension 406 is an optional section that identifies a particular telephone that is typically part of an organization that uses a PBX (Private Branch Extension) as an intermediary between a number of telephone lines and a potentially greater number of telephones.

Figure 5:
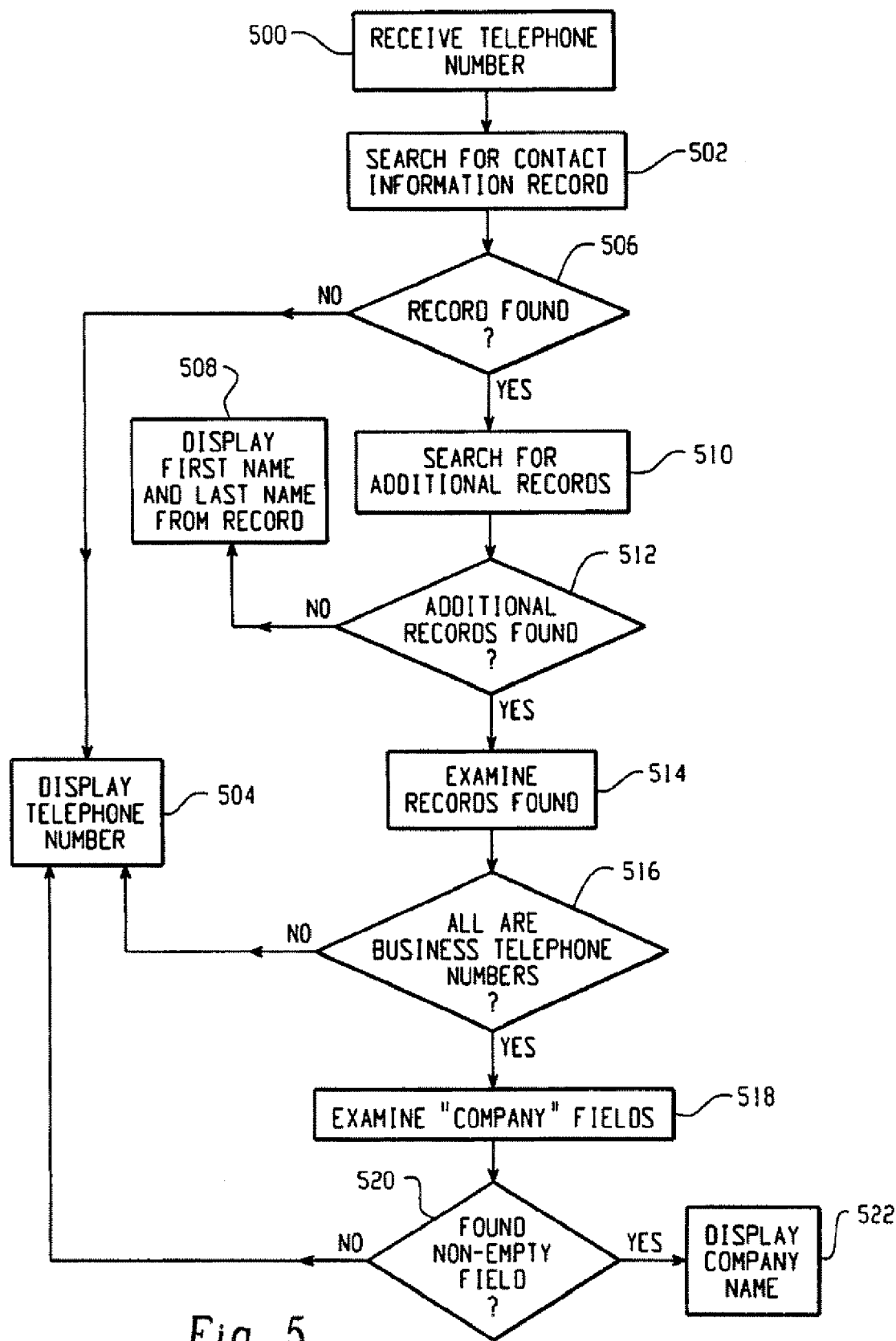
FIG. 5 is a flow chart illustrating an example method of accessing a contact information store.

FIG. 5 is a flow chart illustrating an example method of accessing a contact information store. In this example, the network identifier is a telephone number and the contact information store contains at least contact record fields named "first name," "last name," "business telephone number" and "company." It should be understood, however, that similar methods may be employed using different network identifiers and different contact record fields.

At step 500, a telephone number (ice., network identifier) is received by the mobile communication device. The telephone number may, for example, be included in a communication received from a communication system, or may be provided to the mobile communication device via the user interface by a user wishing to initiate a telephone call. Then, at step 502, the contact information store is searched to identify contact information records having contact record fields with values matching the received telephone number, as described above.

In addition, if a hash table is used to enhance the speed of the search, then, before any telephone numbers are received at step 500, a hash table may be created and stored in a memory module. The hash table keys may be the last seven digits of the phone numbers in the contact information store, excluding extensions, and the hash table values may be the contact information records. The searching step 502 may then use the last seven digits of the received telephone number, excluding extension, as a key into the hash table to retrieve the matching records.

At decision step 506, if no matching contact records have been identified, then the received telephone number is displayed at step 504, and the method ends. If at least one matching contact record is identified, however, then the method continues from decision step 506 to step 510. At step 510, the contact information store is searched for additional matching records, possibly using a hash table as described above. If no additional records are found, as determined at decision step 512, then contact information from the single matching record is displayed at step 508, and the method ends. The contact information displayed at step 508 may, for example, include the values for the first name and last name fields. Otherwise, if additional matching records are identified, then the method continues from decision step 512 to step 514.

At steps 514-520, the identified contact records are examined to determine whether the records are associated with an identifiable business entity. At step 516, the method determines if the matching value in each of the identified records is included in the "business telephone number" field. If the matching values in the identified records are not all business telephone numbers, then the received telephone number is displayed at step 504, and the method ends. If the matching values in the identified records are all business telephone numbers, however, then the method continues to step 518.

At step 518, the "company" field in each of the identified records found is examined. If, at step 520, one of the examined company fields is not empty, then the value for that company field is displayed to the user at step 522. The examination at step 518 stops once a non-empty company field is found. If all of the company fields in the found records have empty values, then the received telephone number is displayed at step 504.

It should be understood that the method of FIG. 5 may be used with contact record fields common to a group of records, other than the illustrated business name and company name fields. For example, if a received call matches the home telephone number field in multiple contact records, then the method may display other record fields common to the identified records, such as a last name field or a household name field.

Cross-referencing the method of FIG. 5 with the example contact information store of FIG. 3, a mobile communication device receiving a communication from telephone number "555-8888" may perform the following operations. At method step 502, the mobile communication device will identify one of three contact records 304, 306, 308 that include the received telephone number "555-8888." The method will then proceed to step 510 and will identify the additional two contact records that include the "555-8888" telephone number in a record field. At step 516, the method will then determine that the received number is included in the "business telephone number" field in each of the three identified records. At step 518, the method will locate a non-empty "company" field, which if examined in order will be the company name "Acme." The identified "company" field will then be displayed at step 522 and the method will end.

In another example, if a mobile device executing the method of FIG. 5 and including the contact information store of FIG. 3 received a communication including the telephone number "555-1234," then the method would proceed as follows. At steps 502 and 506, the method would identify one of two contact information records 300, 302 including the received "555-1234" telephone number. Then, at step 510, the method would identify the second contact information record including the "555-1234" number in one of its telephone number fields. At step 516, the method will determine that the identified fields containing the "555-1234" value are not business telephone number fields. Thus, the method will proceed to step 504 and display the value "555-1234."

Figure 6:
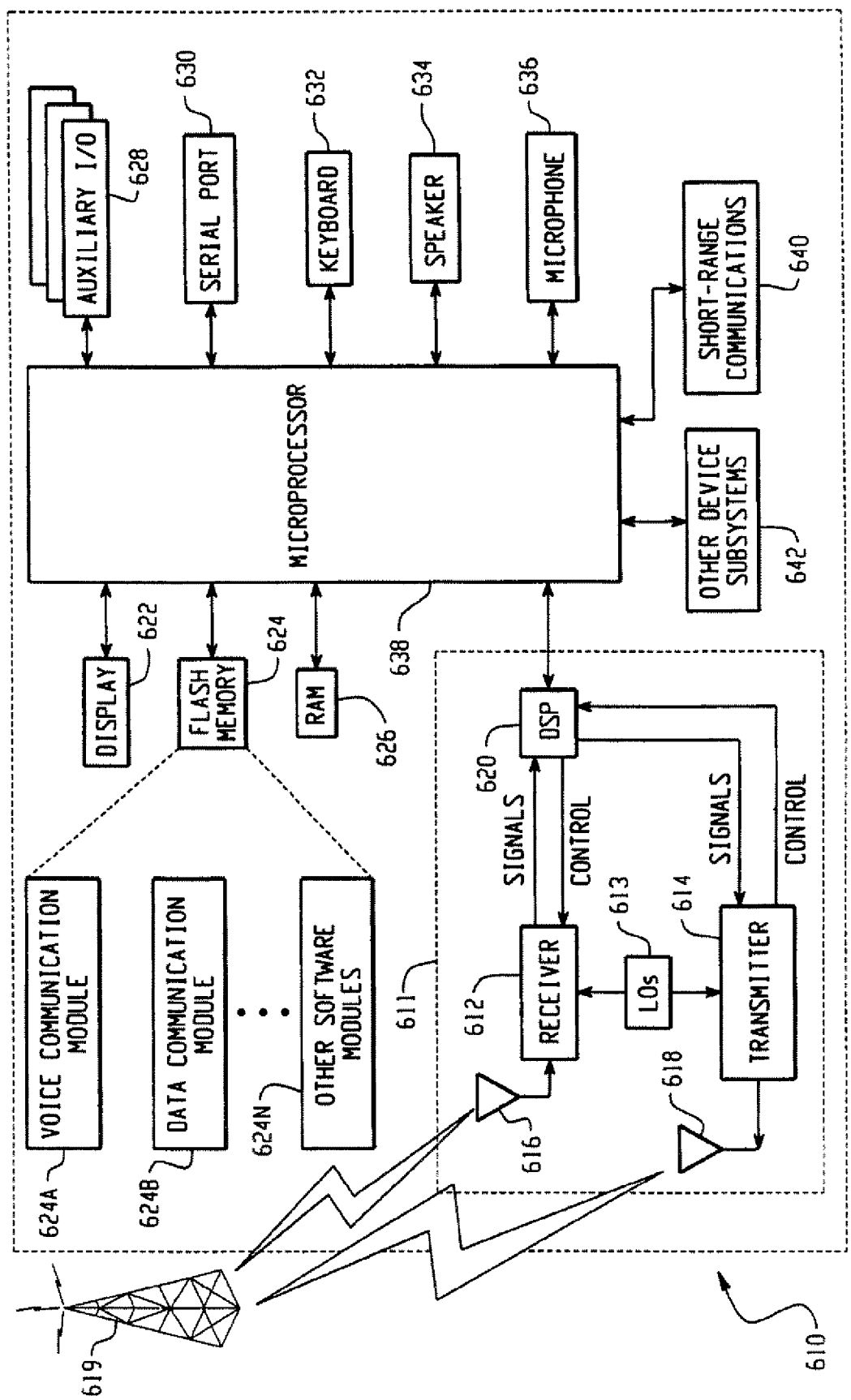
FIG. 6 is a more-detailed block diagram of an example mobile communication device.

FIG. 6 is a more-detailed block diagram of an example mobile communication device 610 that may include the contact information logic unit 210 and contact information store 214 described above. The mobile communication device 610 includes a transceiver 611, a microprocessor 638, a display 622, Flash memory 624, RAM memory 626, auxiliary input/output (I/O) devices 628, a serial port 630, a keyboard 632, a speaker 634, a microphone 636, a short-range wireless communications sub-system 640, and may also include other device sub-systems 642. The transceiver 611 preferably includes transmit and receive antennas 616, 618, a receiver 612, a transmitter 614, one or more local oscillators 613, and a digital signal processor 620. Within the Flash memory 624, the mobile device 610 preferably includes a plurality of software modules 624A-624N that can be executed by the microprocessor 638 (and/or the DSP 620), including a voice communication module 624A, a data communication module 624B, and a plurality of other operational modules 624N for carrying out a plurality of other functions, such as the contact information logic unit 210.

The mobile communication device 610 is preferably a two-way communication device having voice and data communication capabilities. Thus, the mobile device 610 may communicate over a voice network, such as any of the analog or digital cellular networks, and may also communicate over a data network. The voice and data networks are depicted in FIG. 6 by the communication tower 619. These voice and data networks may be separate communication networks using separate infrastructure, such as base stations, network controllers, etc., or may be integrated into a single wireless network.

The communication subsystem 611 is used to communicate with the voice and data network 619, and includes the receiver 612, the transmitter 614, the one or more local oscillators 613, and may also include the DSP 620. The DSP 620 is used to send and receive signals to and from the transmitter 614 and receiver 612, and is also utilized to receive control information from the transmitter 614 and to provide control information to the receiver 612. If the voice and data communications occur at a single frequency, or closely-spaced set of frequencies, then a single local oscillator 613 may be used in conjunction with the transmitter 614 and receiver 612. Alternatively, if different frequencies are utilized for voice communications versus data communications, then a plurality of local oscillators 613 can be used to generate a plurality of frequencies corresponding to the voice and data networks 619. Although two antennas 616, 618 are depicted in FIG. 6, the mobile communication device 610 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., is dependent upon the communication network 619 in which the mobile device 610 is intended to operate. For example, a mobile communication device 610 may include a communication subsystem 611 designed to operate with the Mobitex™, DataTAC™ or General Packet Radio Service (GPRS) mobile data communication networks and also designed to operated with any of a variety of voice communication networks, such as AMPS, TDMA, CDMA, PCS, GSM, etc. Other types of data and voice networks, both separate and integrated, may also be utilized with the mobile communication device 610.

Depending upon the type of network or networks 619, the access requirements for the mobile communication device 610 may also vary. For example, in the Mobitex and DataTAC data networks, mobile devices are registered on the network using a unique identification number associated with each device. In GPRS data networks, however, network access is associated with a subscriber or user of a mobile device. A GPRS device typically requires a subscriber identity module ("SIN4"), which is required in order to operate a mobile device on a GPRS network. Local or non-network communication functions (if any) may be operable, without the SIM, but a mobile communication device may be unable to carry out any functions involving communications over the data network 619, other than any legally required operations, such as 911 emergency calling.

After any required network registration or activation procedures have been completed, the mobile communication device 610 may send and receive communication signals, including both voice and data signals, over the network 619 (or networks). Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding, to be performed using the DSP 620. In a similar manner, signals to be transmitted to the network 619 are processed (e.g., modulated and encoded) by the DSP 620 and are then provided to the transmitter 614 for digital to analog conversion, frequency up conversion, filtering, amplification and transmission to the communication network 619 (or networks) via the antenna 618. Although a single transceiver 611 is shown in FIG. 6 for both voice and data communications, it is possible that the mobile communication device 610 may include two distinct transceivers, a first transceiver for transmitting and receiving voice signals, and a second transceiver for transmitting and receiving data signals.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 to provide more sophisticated control of the transceiver 611.

The microprocessor 638 preferably manages and controls the overall operation of the mobile communication device 610. Many types of microprocessors or microcontrollers could be used, or, alternatively, a single DSP 620 could be used to carry out the functions of the microprocessor 638. Low-level communication functions, including data and voice communications, are performed through the DSP 620 in the transceiver 611. Other, high-level communication applications, such as a voice communication application 624A and a data communication application 624B, may be stored in the Flash memory 624 for execution by the microprocessor 638. For example, the voice communication module 624A may provide a high-level user interface operable to transmit and receive voice calls between the mobile communication device 610 and a plurality of other voice devices via the network 619. Similarly, the data communication module 624B may provide a high-level user interface operable to send and receive data, such as e-mail messages, files, organizer information, short text messages, etc., between the dual-mode mobile device 610 and a plurality of other data devices via the network 619. In the mobile communication device 610, a system or method of accessing contact information may also be implemented as a software module or application, or incorporated into a software module, such as the voice communication module 624A, which uses contact information.

The microprocessor 638 also interacts with other mobile device subsystems, such as the display 622, Flash memory 624, random access memory (RAM) 626, auxiliary input/output (I/O) subsystems 628, serial port 630, keyboard 632, speaker 634, microphone 636, short-range communications subsystem 640 and any other mobile device subsystems generally designated at reference numeral 642.

Some of the subsystems shown in FIG. 6 perform communication-related functions, whereas other subsystems may provide "resident" or on-device functions. In addition, some subsystems, such as keyboard 632 and display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as Flash memory 624. In addition to the operation system, which controls all of the low-level functions of the mobile device 610, the Flash memory 624 may include a plurality of high-level software application programs, or modules, such as a voice communication module 624A, a data communication module 624B, an organizer module, or any other type of software module 624N. The Flash memory 624 also may include a file system for storing data. These modules are executed by the microprocessor 638 and provide a high-level interface between a user of the mobile device and the mobile device. This interface typically includes a graphical component provided through the display 622, and an input/output component provided through the auxiliary I/O 628, keyboard 632, speaker 634, and microphone 636. The operating system, specific mobile device software applications or modules, or parts thereof may be temporarily loaded into a volatile store, such as RAM 626, for faster operation. Moreover, received communication signals may also be temporarily stored to RAM 626 before being permanently written to a file system located in the persistent store 624.

An exemplary application module 624N that may be loaded onto the mobile communication device 610 is a personal information manager (PIM) application providing PDA functionality, such as calendar events, appointments, and task items. This module 624N may interact with the voice communication module 624A for managing phone calls, voice mails, etc., and may also interact with the data communication module for managing e-mail communications and other data transmissions. Alternatively, all of the functionality of the voice communication module 624A and the data communication module 624B may be integrated into the PIM module.

The Flash memory 624 preferably provides a file system to facilitate storage of PIM data items on the mobile communication device 610. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user. Contact information is also preferably stored to the Flash memory 624.

The mobile device 610 may also be manually synchronized with a host system by placing the mobile device 610 in an interface cradle, which couples the serial port 630 of the mobile device 610 to the serial port of the host system. The serial port 630 may also be used to enable a user to set preferences through an external device or software application, or to download other application modules 624N for installation.

Additional application modules 624N may be loaded onto the mobile communication device 610 through the network 619, through an auxiliary I/O subsystem 628, through the serial port 630, through the short-range communications subsystem 640, or through any other suitable subsystem 642, and installed by a user in the Flash memory 624 or RAM 626. Such flexibility in application installation increases the functionality of the mobile device 610 and may provide enhanced on-device functions, communication-related functions or both. For example, secure communication applications may enable electronic commerce functions and other such financial transactions to be performed using the mobile device 610.

When the mobile communication device 610 is operating in a data communication mode, a received signal, such as a text message or a web page download, will be processed by the transceiver 611 and provided to the microprocessor 638, which will preferably further process the received signal for output to the display 622, or, alternatively, to an auxiliary I/O device 628. A device user may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 610 is further enhanced with a plurality of auxiliary 110 devices 628, which may include a thumbwheel input device, a touchpad, a variety of switches, a rocker input switch, etc. The composed data items input by the user may then be transmitted over the communication network 619 via the transceiver 611.

When the dual-mode mobile device 610 is operating in a voice communication mode, the overall operation of the mobile device 610 is substantially similar to the data mode, except that received signals are preferably output to the speaker 634 and voice signals for transmission are generated by a microphone 636. Alternative voice or audio I/O subsystems, such as a voice message recording subsystem, may also be implemented on the mobile device 610. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module and the operating system software, may detect the caller identification information of an incoming voice call and display it on the display 622, as described above.

A short-range communications subsystem 640 is also included in the mobile communication device 610. For example, the subsystem 640 may include an infrared device and associated circuits and components, or a short-range wireless communication module such as a Bluetooth™ module or an 802.11 module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art. For example, although systems and methods for accessing contact information are described primarily as being implemented on a mobile communication device, these systems and methods could also be implemented on other types of communication devices, including a telephone and a personal computer. Also, the network identifier used to retrieve information from a contact information store is described primary as a telephone number, however, it could be a network identifier used by another network, such as an Internet Protocol (IP) address.

The invention claimed is:

1. A method comprising:
    storing contact records, each record having values in respective fields, including first and second fields and a contact identifier field;
    receiving, from a communication network, a communication that includes a network identifier;
    determining which of the records match the identifier based on the value in the respective record's contact identifier field matching the identifier; and
    if multiple records match the identifier and those matching records have a common value in the first field, then displaying, without duplication, the common value.

2. The method of claim 1 further comprising:
    if multiple records match the identifier and those matching records have a first common value in the first field and a second common value in the second field, then displaying both the first common value and the second common value.

3. The method of claim 1 wherein said displaying includes displaying the network identifier in addition to said common value.

4. The method of claim 1 wherein said displaying includes not displaying any value that is not common to all the matching records.

5. The method of claim 1 further comprising:
if no records match the identifier, then displaying the network identifier.

6. The method of claim 1 further comprising:
if only one record matches the identifier, then displaying the value that is in a name field of the matching record.

7. The method of claim 1 wherein the first field is a last name field and the second field is a first name field.

8. The method of claim 1 wherein the first field is a company name field and the second field is a contact name field.

9. The method of claim 1 wherein the first field is an address field and the second field is a name field.

10. The method of claim 1 wherein the network identifier is a telephone number, and the contact identifier field is a telephone number field.

11. The method of claim 10 wherein the determining of which records match the identifier is based on the last seven of digits of the telephone number matching the last seven digits of the value in the telephone number field.

12. The method of claim 1 wherein, in each record, the contact identifier field includes first and second telephone numbers.

13. The method of claim 1 wherein the storing, receiving, determining and if-then steps are performed by a mobile communication device.

14. A method comprising:
storing contact records, each record having values in respective fields, including first and second fields and a contact identifier field;
receiving, from a communication network, a communication that includes a network identifier;
determining which of the records match the identifier based on the value in the respective record's contact identifier field matching the identifier; and
if multiple records match the identifier and those matching records have a common value in the first field, then displaying the common value and not displaying any value that is not common to all the matching records.

15. The method of claim 14 further comprising:
if multiple records match the identifier and those matching records have a first common value in the first field and a second common value in the second field, then displaying both the first common value and the second common value.

16. The method of claim 14 wherein the first field is a last name field and the second field is a first name field.

17. The method of claim 14 wherein the network identifier is a telephone number, and the contact identifier field is a telephone number field.

18. The method of claim 14 wherein the storing, receiving, determining, and if-then steps are performed by a mobile communication device.

\* \* \* \* \*